Figure 1:
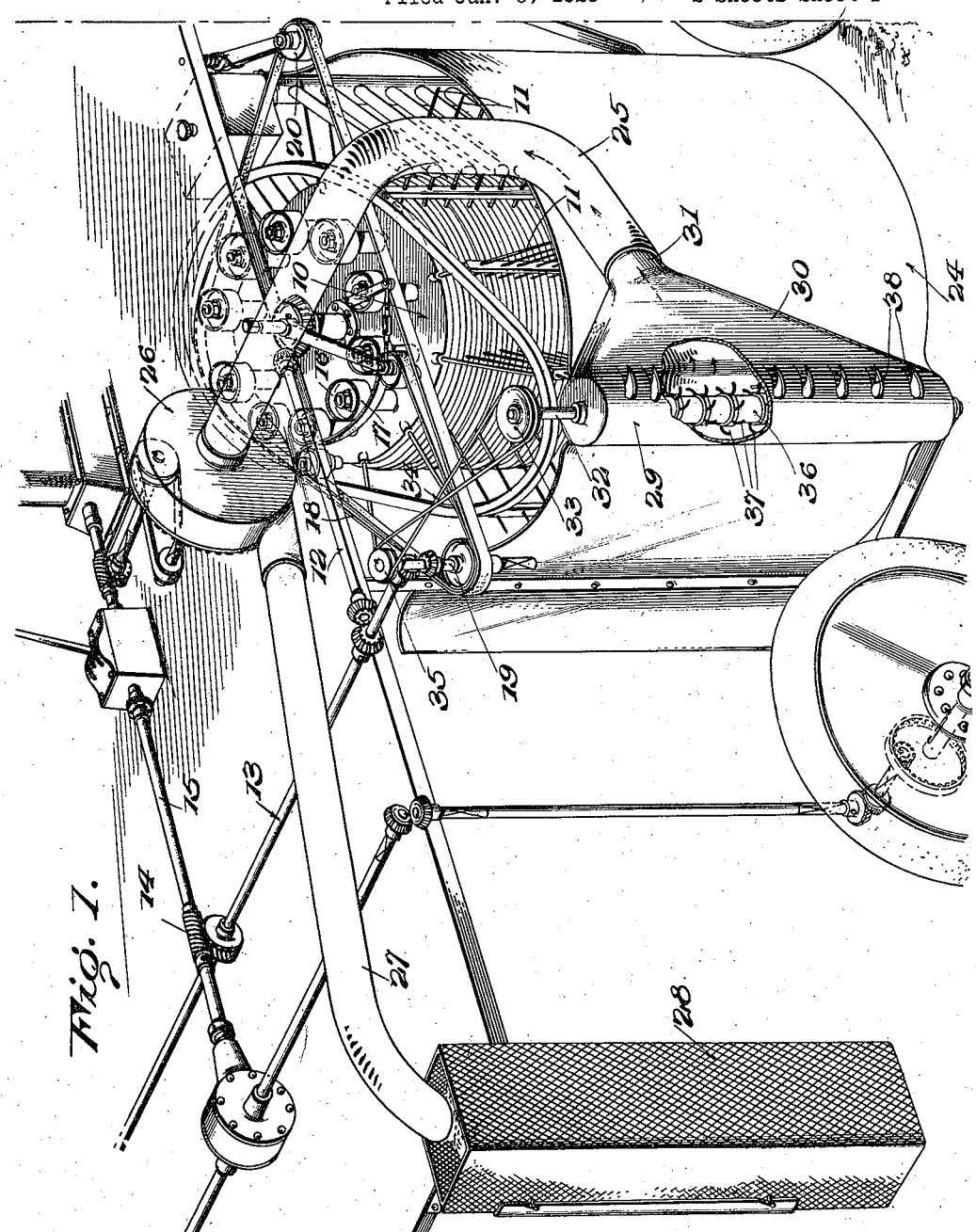

Dec. 14, 1926.

H. N. BERRY

COTTON PICKER

Filed Jan. 3, 1925

1,610,240

2 Sheets-Sheet 1

WITNESSES

INVENTOR
H. N. Berry.
BY
ATTORNEYS

Dec. 14, 1926.
H. N. BERRY
COTTON PICKER
Filed Jan. 3, 1925
1,610,240
2 Sheets-Sheet 2
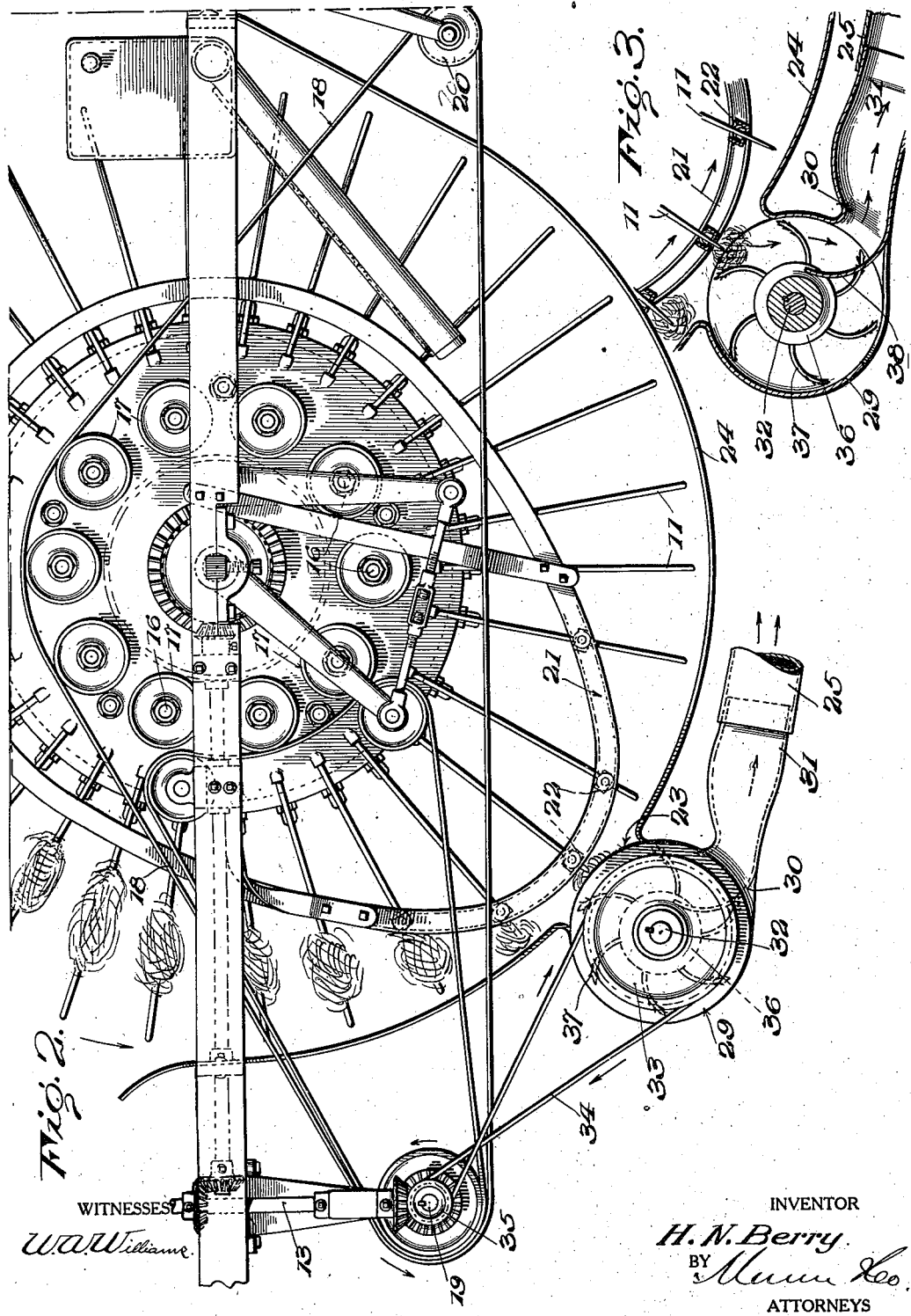
INVENTOR
H. N. Berry
BY
ATTORNEYS Patented Dec. 14, 1926.

1,610,240

UNITED STATES PATENT OFFICE.

HIRAM NEWTON BERRY, OF GREENVILLE, MISSISSIPPI, ASSIGNOR OF ONE-HALF TO HUGH A. GAMBLE, OF GREENVILLE, MISSISSIPPI.

COTTON PICKER.

Application filed January 3, 1925. Serial No. 450.

My present invention relates generally to cotton pickers, and more particularly to cotton pickers of the type described and claimed in my Patent 1,530,151, granted March 17, 1925, and which contemplates removal of cotton from cotton plants by the passing of rapidly rotating fingers through the plant whereby the cotton upon contact with the fingers will be wrapped thereon and jerked out of the boll.

The picking fingers just above referred to, project in practice radially in a considerable series from a pair of laterally spaced vertical picking cylinders, these cylinders being rotated in conformity to the speed of movement of the vehicle upon which the picking apparatus is mounted so that in their movement through the cotton plants they are relatively stationary to the plants except for their speedy rotation upon their own axes. It has always been considerable of a problem in apparatus of this character to provide fingers of such a nature as to effectively remove the cotton and at the same time permit of subsequent ready withdrawal of the cotton from the picking fingers, a problem which my last above mentioned application went a long way toward solving in view of my discovery that a smooth picking finger, that is one having a smooth tapering external surface, could be made highly effective in the picking operation by moistening the surface sufficiently so that the wisps of cotton would adhere to the surface of the finger to an extent enabling the rapidly rotating finger to wrap the cotton therearound. Previous to this discovery it had always been deemed necessary to use a picking finger having its surface roughened in one way or another to an extent necessary to cause adherence of the cotton thereto.

While the use of a smooth picking finger has been a great help in that it provides for much easier subsequent removal of the picked cotton from the picking fingers, I have found that there is still a tendency of the cotton when pushed lengthwise of the fingers to collect at the finger ends and inasmuch as it is of course highly important that all of the cotton be cleared off of the fingers, my present application proposes means whereby to actually pull the cotton off of the fingers in clearing the latter.

In the accompanying drawings, for purposes of illustration, I have shown portions of the apparatus illustrated in my last above named application sufficient for the present purposes, and in these drawings, Figure 1 is a perspective view of a portion of the cotton picking apparatus showing my present improvements, Figure 2 is a top plan view thereof, and Figure 3 is a horizontal sectional view taken at a central point through the finger clearing device proposed by my invention.

According to my present invention each of the picking cylinders, of which one is indicated at 10, with its multitude of picking fingers 11 radiating therefrom, is driven by connections including a longitudinal shaft 12 geared at its forward end to the cylinder and at its rear end to a cross shaft 13, the latter actuated by virtue of its geared connection at 14 with the engine shaft 15. These connections are the same as in my previous application, and like that application my present device contemplates the rotation of the picking fingers from vertical shafts 16 mounted through the cylinder, having pulleys 17 at their upper ends engaged along the inner portion of the periphery of the cylinder by a portion of a belt 18 extending between a driven shaft 19 and a tension pulley 20, the shaft 19 of each cylinder being geared to the respective end of the cross shaft 13 above mentioned.

Also as in my previous application cotton picked by the fingers along the inner portion of the periphery of the cylinder is removed at the outer rear portion of the cylinder by virtue of slides shiftable along the fingers and guided in cam tracks 21, these slides being indicated at 22 and being in their outermost positions as indicated in Figure 2 opposite a vertical channel 23 in a shield 24 around the outer portion of the cylinder where in accordance with my previous application the cotton was removed by a suction pipe 25 leading to a fan casing 26 whose discharge pipe 27 empties into a rear removable cotton receptacle 28.

According to my present improvements, the shield 24 is provided with a vertical tubular casing 29 into which the channel 23 opens, this tubular casing having intermediate its ends a laterally projecting funnel shaped extension 30 terminating in a nipple 31 to which the suction pipe 25 is connected. This tubular casing is furthermore provided with an axial shaft 32 whose upper end has a pulley 33 connected by a belt 34 with a pulley 35 mounted upon the upper end of the adjacent vertical shaft 19 driving the finger actuating belt 18. Belt 34 is twisted as shown in Figure 2 in order to rotate the shaft 32 with the adjacent cylinder and this shaft 32 is provided, within the tubular casing 29, with a drum 36 having along its periphery vertically spaced annular series of curved outstanding barbs 37 of such length that their free ends swing in the rotation of the shaft 32 closely adjacent to the rotation of the picking fingers as the latter pass the channel 23, the barbs being thus adapted to engage the cotton pushed to the end of the fingers so as to positively remove the cotton from the fingers.

Moreover the tubular casing 29, as shown particularly in Figure 3, is provided with inwardly curved lips 38, spaced so that the barbs 37 can pass between the lips. Thus the lips 38 act to assist in stripping the cotton from the barbs so that the suction, the latter of which of course assists both in the removal of cotton from the fingers and from the barbs, may then act to pull the cotton into the suction pipe 25.

With my present improvements, serving as they do to positively remove all cotton from the picking fingers, and insure the subsequent movement of the picking fingers clear and clean toward the inner or active portion of the periphery of the cylinder, the efficiency thereof in the picking operation is increased and the operation as a whole is rendered more satisfactory.

I claim:

1. In a cotton picker, a vertically disposed picking cylinder having radially outstanding picking fingers, a shield around a portion of said cylinder having a vertical tubular casing and a channel therethrough opening into said casing, means to push cotton outwardly on the fingers adjacent to the finger ends at a point opposite the said channel, a cotton removing suction pipe in communication with said tubular casing, a vertical member within the tubular casing having peripherally outstanding barbs rotatable in close proximity to the ends of the picking fingers for the removal of cotton from the latter, and means for rotating the said barb carrying member, the said vertical tubular casing having inwardly curved lips and provided with spaces between said lips for the passage of the barbs therethrough.

2. In a cotton picker, a picking cylinder having peripherally outstanding picking fingers, and means for shifting picked cotton outwardly along the fingers to the extremities thereof at one point in the rotation of the cylinder, a vertically disposed rotatable stripping member adjacent to the said point in the rotation of the picking cylinder having outstanding barbs, a shield along a portion of the periphery of the picking cylinder having a casing in which said stripping member is mounted and having means extending between the barbs and acting to free the cotton therefrom, and a suction pipe in communication with said casing.

3. In a cotton picker, a picking cylinder having peripherally outstanding picking fingers, and means for shifting picked cotton outwardly along the fingers to the extremities thereof at one point in the rotation of the cylinder, a vertically disposed rotatable stripping member adjacent to the said point in the rotation of the picking cylinder, having peripherally outstanding barbs for movement closely adjacent to the extremities of the picking fingers, a casing in which said stripping member is mounted, and a suction pipe in communication with said casing, said casing having therein means cooperating with the suction through the suction pipe for removing cotton from the finger stripping barbs.

4. In a cotton picker including a picking cylinder having radially outstanding rotatable picking fingers and pneumatic delivery means including a suction mouth vertically along and adjacent to said cylinder, a member rotatable adjacent to and along the picking fingers of the cylinder and having means to remove cotton from the fingers and deliver the same into said suction mouth, and a casing adjoining the suction mouth and in which said member rotates and means projecting within the casing and into the path of movement of said members, said means cooperating with the suction, and acting in conjunction with said member to remove cotton from the latter at a point within the casing.

HIRAM NEWTON BERRY.